United States Patent [19]

Hill

[11] 3,972,615
[45] Aug. 3, 1976

[54] DETERMINATION OF SEMI OPAQUE PLASMA TEMPERATURES

[75] Inventor: Robert D. Hill, Santa Barbara, Calif.

[73] Assignee: The United States of America as represented by the Secretary of the Navy, Washington, D.C.

[22] Filed: Jan. 17, 1975

[21] Appl. No.: 541,957

[52] U.S. Cl. .................................. 356/45; 356/74
[51] Int. Cl.² ......................................... G01J 5/60
[58] Field of Search ................. 356/43, 45, 74, 76, 356/77, 85

[56] References Cited
UNITED STATES PATENTS
3,817,622   6/1974   Billman et al. .................. 356/43 X OTHER PUBLICATIONS
Shumaker et al. National Bureau of Standards Special Publication 300, vol. 2, 1968, pp. 416–420.

*Primary Examiner*—John K. Corbin
*Assistant Examiner*—F. L. Evans
*Attorney, Agent, or Firm*—R. Sciascia; R. Beers; S. Sheinbein

[57] ABSTRACT

The temperature of heated gaseous plasmas in non-controllable, non-laboratory applications is measured by an improved spectroscopic analysis. A low atomic number trace gas, such as hydrogen, or helium, is added to the plasma. Temperature is obtained by measuring the ratio of the intensities of two lines of the hydrogen-atom series, e.g. $H_\alpha$ and $H_\beta$ lines of the BALMER SERIES. The technique is applicable in the few electron volt range and the method is applicable even though the plasma is not optically thin and the total number density of the particles in the plasma, at the instant the measurement of temperature is performed, is unknown.

4 Claims, 1 Drawing Figure

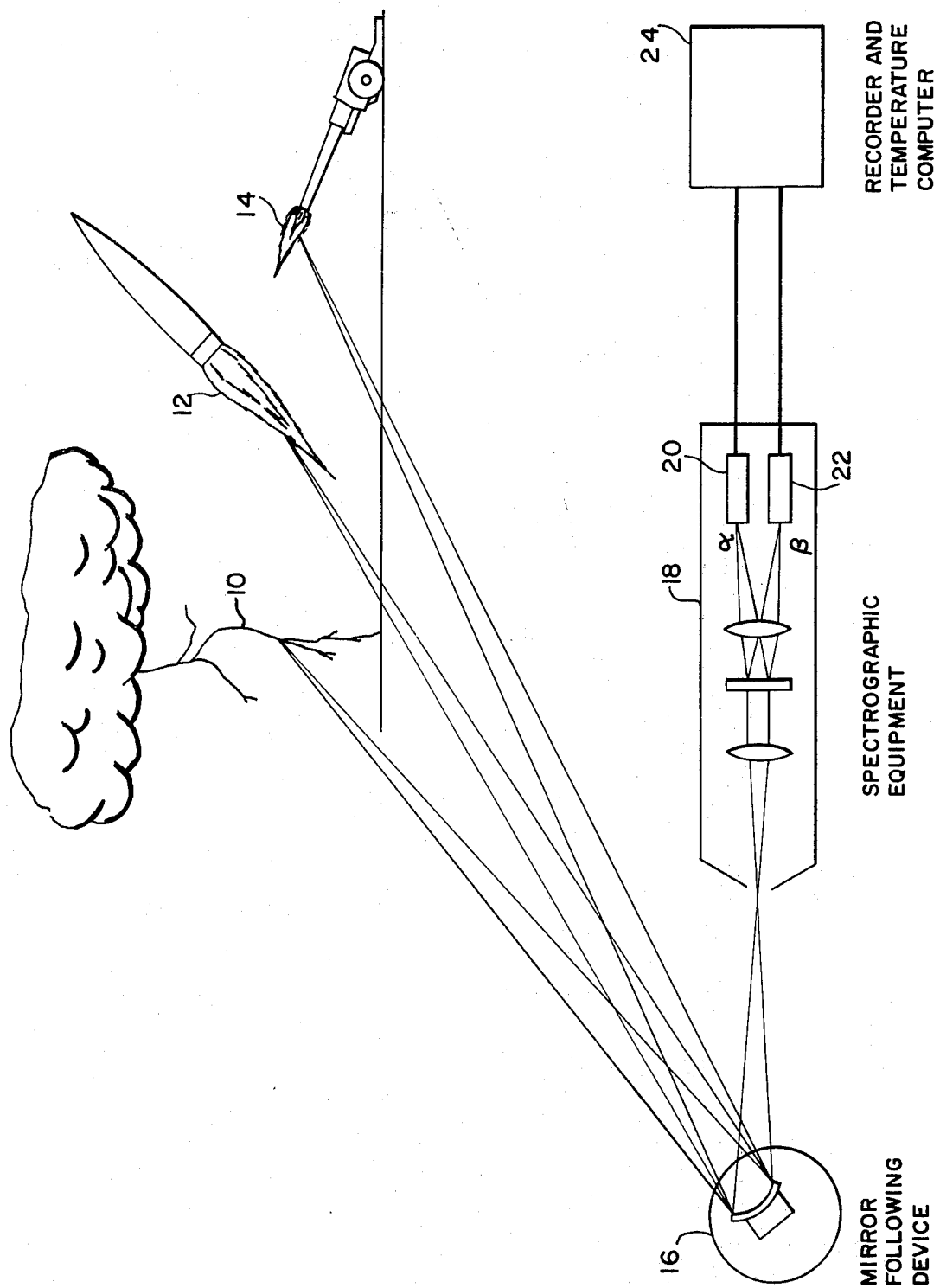

DETERMINATION OF SEMI OPAQUE PLASMA TEMPERATURES

BACKGROUND OF THE INVENTION

The present invention relates generally to the field of relatively high temperature measurement of heated gaseous plasmas in a medium which is not strictly controllable.

The best methods of existing plasma-temperature measurements make use of spectrographic techniques. Confining the range of temperatures discussed to less than of the order of 50,000°K, the principles of so-called "spectroscopic thermometry" in this range have been discussed, for example, by National Bureau of Science (NBS) research workers (N.B.S Special Publication 333, Vol. 2 pp. 407–443, August 1968) and also by W. Lochte-Holtgreven (Reports of Progress in Physics, Vol. XXI, pp. 312–383 (1958)).

As described by Lochte-Holtgreven, the spectrographic temperature-measurement method requires the solution of a number of equations involving certain unknowns such as: temperature T, and densities of a number of species of atoms and ions in the plasma. For example, in a 3-component plasma composed of air (i.e. nitrogen and oxygen) and hydrogen. For this plasma, in the temperature range of interest there are 8 unknowns which include: temperature T, electron density $n_e$, and $n_+$ and $n_o$ the positive ion and neutral atom densities of each species. An accurate evaluation of T, therefore, requires establishing 8 equations, 6 of which are as follows:

$$(n_{N+}) + (n_N) + (n_{O+}) + (n_O) + (n_{H+}) + (n_H) = (N) \quad (1)$$

$$(n_{N+}) + (n_N) = 3.72\,[(n_{O+}) + (n_O)] \quad (2)$$

$$(n_{N+}) + (n_{O+}) + (n_{H+}) = (n_e) \quad (3)$$

$$(n_+) \cdot (n_e)/(n) = f(T) \text{ for H, N and O} \quad (4)$$

where (N) is the total number-density of particles in the plasma, $(n_+)$ and $(n)$ denote densities of positive ions and neutral atoms, respectively, of each of the 3 species, and $f(T)$ is the function of T which appears in the Saha equation, i.e. considering only singly ionized species:

$$\frac{f(T)}{2} = \left(\frac{2\pi m k T}{h^2}\right)^{3/2} \cdot \exp(E/kT) \quad (7)$$

where $k$ and $h$ are Boltzmann's and Planck's constants, respectively, E is the ionization energy of each particular species (i.e. H, N or O) and $m$ is the electronic mass. Two further equations are still needed for a complete solution. These equations must be obtained from some experimental determinations of the physical condition of the plasma.

Usually the method has been to determine the necessary equations from measurements of spectral-line intensities. The intensity $I_{m,r}$ of a line emitted in a transition between levels m and r of a species (which may be neutral or ionized) in local thermodynamic equilibrium (LTE) with the plasma is given by:

$$I_{m,r} = A_{r,m} \cdot g_m/U \; n.h\nu \cdot \exp(-E_m/kT_e) \quad (8)$$

where $A_{r,m}$ is the Einstein transition probability between the states $r$ and $m$, $g_m$ is the statistical weight of state $m$, U is the partition function for the neutral or positive ion species of number density n, and $E_m$ is the excitation energy of the state m above the ground level.

Since it is generally considered that a plasma, being in a static or semi-static condition, is in the local thermodynamic equilibrium (LTE), the electron temperature $T_e$ is assumed to be equal to the gas temperature T of the plasma. Furthermore, if the sample of plasma from which the line is observed is optically thin, it may be considered, for all practical purposes, that the measured line intensity is identical with the theoretical value given in Eq (8). In principle, therefore, measurement of the intensities of two lines from any species of the plasma then completes the number of equations required and allows a temperature to be evaluated.

Certain alternative spectrographic measurements may be considered in place of either or both of the last two equations just mentioned. As Lochte-Holtgreven pointed out, one alternative is to measure $n_e$, the electron density, instead of one of the line intensities. The electron density in a plasma can be measured by determining the shape of certain lines broadened by the surrounding ionized plasma. Theory of the Stark Effect can then be employed to relate the line shape to the electron density and plasma temperature.

In the case of a lightning-column plasma (as well as other cases of externally uncontrolled plasmas) it is not possible to specify at any particular time the total density, N, of particles in the plasma. This means that Eq (1) cannot be established and consequently n in Eq (8) is unspecifiable. The technique just described is therefore inoperable. In this case it has been the practice in lightning-temperature measurements, following Prueitt and Orville (Jour. Geophys. Res. 68, p. 803 (1963), and Journ. Atmos. Sci. 25, p. 827, 839 (1968)) to eliminate n from Eq (8) by determining the ratios of intensities of pairs of spectral lines emitted from the same species. Thus, for two lines of frequencies $\nu_{m,r}$ and $\nu_{p,q}$, the ratio of intensities $I_{m,r}$ and $I_{p,q}$ is given by:

$$\frac{I_{m,r}}{I_{p,q}} = \frac{A_{r,m} \cdot g_m \cdot \nu_{m,r} \cdot \exp[-(E_m - E_p)/kT]}{A_{q,p} \cdot g_p \cdot \nu_{p,q}} \quad (9)$$

Since parameters: A, g, $\nu$ and E are known either from theory or from basic spectroscopic data, the value of T can be obtained from an experimental measurement of the ratio $I_{m,r}/I_{p,q}$ and use of Eq (9).

The basic assumptions of the foregoing spectrographic methods are: (1) that local thermodynamic equilibrium holds in the plasma region and (2) that the plasma responsible for the observed emission is optically thin.

Under normal circumstances of spectrographic observations (where the duration times of observation are longer than of the order of microseconds which are the normal times of equilibration) it is very probable that the assumption of LTE is valid. However, with respect to the second assumption cited above, and certainly under conditions external to the laboratory (and even under some laboratory conditions) it is improbable that emissions occur from a volume region of the plasma which is optically thin. An analysis of emission line radiation from a typical lightning channel by Hill (Journ. Geophys. Res. 77, p. 2642 (1972)) showed that most radiations are moderately strongly absorbed in emerging from the channel. Thus in reality a plasma cannot be treated as optically thin.

SUMMARY OF THE INVENTION

In the improved method of the present disclosure, the temperature of the plasma is determined from a trace species, usually hydrogen, which is either added to the main plasma constituent or appears naturally in the plasma as in the case of the lightning channel. A determination of the plasma temperature is made by measuring the ratio of the intensities of two lines of the hydrogen-atom series, e.g. $H\alpha$ and $H\beta$ lines of the Balmer series, having wavelengths of 6562.8A and 4861.3A, respectively. This method, using the ratio of two helium-atom or two hydrogen-atom lines, is applicable even though the plasma is not optically thin and even though the total number density of the plasma at the instant the measurement of temperature is made is unknown.

OBJECTS OF THE INVENTION

An object of this invention is to improve methods for the measurement of temperatures of heated gaseous plasmas, and in particular of non-controllable, non-laboratory, plasmas.

Other objects, advantages and novel features of the present invention will become apparent from the following detailed description of the invention when considered in conjunction with the accompanying drawing.

BRIEF DESCRIPTION OF THE DRAWING

The single FIGURE is a schematic diagram of the principal components needed to carry out the present method.

DETAILED DESCRIPTION OF THE INVENTION

The technique of using hydrogen as a trace element in a plasma to determine its temperature has already been used by Shumaker and Wiese, who were able, moreover, to make the temperature determination even though the plasma was optically thick. However, a very important provision was demanded: the total number density of plasma particles had to be specified otherwise the electron density (measured from line shape of either the $H\alpha$ or $H\beta$ line) could not be related to plasma temperature. ("Measurement of Electron Density and Temperature in Dense Plasma by Application of Line Broadening Theory" Shumaker and Wiese, NBS Special Publication 300, Volume 2, pages 416–420 (1968).)

Since the technique of the present disclosure is closely related to, yet distinct from, the Shumaker-Wiese technique, it is helpful to illustrate a number of features of the new method by reference to their experiment and to other experiments of this group.

It is essential, for example, that the intensities of the H-atom lines be measured correctly, i.e. by integration of the line intensity across the whole of the broadened line. Popenoe and Shumaker ("Arc Measurements of Some Argon Transition Probabilities," NBS Special Publication 300, Volume 2, pages 424–438 (1968)) measured $H\alpha$ and $H\beta$ line shapes for the purpose of determining electron densities. In one experiment they found that peak height intensities of $H\alpha$ and $H\beta$ lines were $2.7\times10^{18}$ and $1.25\times10^{17}$ photons/cm³ sec A, respectively. As is readily checked, this value, for the plasma used by Popenoe and Shumaker (an optically thin argon plasma), is clearly incorrect since substitution of this value of $H\alpha /H\beta$ for $I_{m,r}/I_{p,q}$ in Eq (9) yields a derived value of T of only 3600°K. From the shapes and intensities of the lines given by Popenoe and Shumaker, however, it is possible to obtain complete agreement with the known plasma temperature and the properly derived $H\alpha /H\beta$ intensity ratio if the following technique is used. Integration over the whole of the broadened $H\alpha$ and $H\beta$ lines was found to give intensities of $2\times10^{14}$ and $4.5\times10^{18}$ photons/cm³ sec, respectively. Together with Eq (9) and the theoretical data of the $H\alpha$ and $H\beta$ transitions in hydrogen, the ratio of $H\alpha /H\beta$ equal to 4.45 from the above figures yields a plasma temperature of 11,500°K. This value is in good agreement with that determined by Popenoe and Shumaker using their method of relating an electron density to the temperature of a known density plasma and it clearly illustrates that the line intensities must be obtained by integrating totally over the lines.

Although measurement of electron densities made by Shumaker and Wiese and by Popenoe and Shumaker were valid for either an optically thick plasma (as in Shumaker and Wiese's case) or for an optically thin plasma (as in Popenoe and Shumaker's case), the transition probabilities as determined by Eq (8) were previously accepted as being only valid for an optically thin plasma. Optically thick plasmas are defined by $\mu_\nu \leq 1$. (See later discussion for definitions of $\mu_\nu$ and L.) Optically thin plasmas are defined by $\mu_\nu L \to o$. A discovery or addition of the present invention is that Eq (8) is also valid for a partly-thick plasma. This discovery is based on a theoretical analysis of a hydrogen plasma by Bates, Kingston and McWhirter ("Recombination of electrons and atomic ions (II) in optically thick plasmas", Proc. Roy. Soc. Lond. A270, p. 155 (1962).)

It has been discovered that hydrogen plasma in trace amounts behaves precisely the same as in a complete hydrogen plasma (which was assumed to be the medium in Bates, Kingston and McWhirter's analysis.) This can be demonstrated theoretically. The significant result of the Bates, Kingston and McWhirter analysis is that even in reasonably optical-thick hydrogen plasmas (such as, for example, hydrogen plasmas which absorb completely all the Lyman series radiations) the level densities of H-atoms above the first excited state ($p$=2) are disturbed insignificantly by absorption of radiation generated in the plasma. The reason for this absence of disturbance is fundamentally that radiation processes (which determine whether the plasma is thick or thin) are of minor importance compared to collisional excitations and de-excitations in a highly ionized plasma. This fundamental characteristic, which is basic to the new technique proposed, will be discussed further herein below.

Another experimental correction to the observed intensity of a spectral line is, however, also required; namely, a correction factor must be applied to the observed intensity for the reduction in intensity of the observed line-radiation emerging from the source. This is essentially only a purely experimental factor. In the case of laboratory plasmas of a uniform geometrical configuration and for a plasma of known distributed density this correction can be evaluated by an Abel integration technique. In the case of a complicated source such as a channel of lightning plasma the factor can probably only be estimated by iteration techniques and by reference to a plausible model of the lightning channel. This may be the largest source of error in the temperature determination but it is common to all techniques which attempt to determine temperatures of thick plasmas. It is, therefore, not considered basic to the new technique of the present disclosure.

As has been already stated, the technique of temperature evaluation using electron density measurement has no possible application to plasmas whose densities and constituent concentrations are unknown. Further, the technique of line-intensity measurements is generally not applicable for temperature evaluations in plasmas which are thick or partially thick. However, the inventive concept of the invention lies in the discovery that a particular application exists in the case when a low atomic number trace gas, such as hydrogen or helium is added to a partially-thick plasma. In this case measurements of the intensities of hydrogen-atom lines emitted from excited states higher than the $p=2$ state (i.e. the level having an excitation energy of 10.2 e.v. above the ground state) may be used to evaluate the temperature of a partially-thick plasma if the electron density is not too high.

By the term partially-thick plasma is meant one for which the absorption $\mu_\nu L$ approaches unity, where $\mu_\nu$ is the absorption coefficient for radiation of frequency and $L$ is some representative length of the source in the direction of observation. The lightning plasma channel is an exemplar case. According to a model of the channel proposed by Hill (see previous reference) at 2 to 3 microseconds after breakdown the value of $\mu_\nu L$ was equal to 0.6 for the $H_\alpha$ radiation. Thus the lightning channel may be considered as partially thick to Balmer series lines. It is known, however, that most of this absorption occurs in the nitrogen and oxygen plasma of the lightning channel, but this does not modify the observations stated above.

Although a plasma containing hydrogen may be only partially-thick to the Balmer series lines (i.e. $H_\alpha$, $H_\beta$, etc.), the plasma may be quite thick (i.e. $\mu_\nu L >> 1$) to radiations from the more energetic Lyman series of hydrogen. This is precisely one of the theoretical cases considered by Bates, Kingston and McWhirter (see previous reference). The importance of this theoretical analysis is that even in the case of all Lyman series lines absorbed, Bates, Kingston and McWhirter concluded that H-atoms of those levels above the $p=2$ level (see above) will be statistically distributed according to the Saha equation under certain conditions. These conditions are: (1) that the mean temperature of the plasma must be significantly less than the energy of the first excited state of hydrogen (i.e. 10.2 e.v.) and (2) that the electron density in the plasma must be less than $10^{14+w}$ electrons per cm$^3$, where $w$ is given by: $w=\log_2 (T°K/1000)$. Interpreting the first condition to mean that T should be less than several e.v. (i.e. less than 3 or 4 times 11,600°K), and the second condition is interpreted to restrict $n_e$ to less than approximately $10^{19}$ per cm$^3$ if T is as high as approximately 40,000° or 50,000°K.

The statement that a trace of hydrogen in a plasma at a temperature of less than of the order of 50,000°K has its higher energy levels distributed according to the Saha law also has additional support.

Using approximate estimates of the cross sections for the elastic and inelastic scattering of photons by hydrogen atoms (see, for example, Atomic Theory of Gas Dynamics by Bond, Watson and Welch, page 125) and if we use estimates of the H-atom lines and background continuum intensities observed in lightning spectra by Connor (Los Alamos Report, LA-3754, Volumne I (1967)) it is found that the combined excitation rate from the ground state and first excited state of a few percent Lyman-thick hydrogen gas immersed in a lightning plasma is of the order of $6\times10^{14}$ per cm$^3$ per sec. Under the same conditions of the lightning plasma just considered, it is also possible to estimate, using Bates, Kingston and McWhirter's theory, the rate of collisional excitation from the ground state and first excited state of hydrogen. The collisional excitation rate if found to be of the order of $3\times10^{19}$ per cm$^3$ per sec., or approximately 50,000 times larger than the radiative excitation. In LTE, the excitation and de-excitation processes, both collisional and radiative, are in equilibrium. Therefore one concludes that the radiative processes in a hydrogen plasma, or in a trace-hydrogen plasma, are of little importance relative to collisional processes if the temperature and electron density are sufficiently high. Since the only disturbances from Saha equilibrium will occur in thick plasmas if radiation processes predominate, the conclusion is that under the conditions found in a lightning plasma channel (and other plasmas satisfying similar conditions) the excited hydrogen-atom levels above $p=2$ will be statistically distributed.

Turning to the FIGURE, the principal components necessary to carry out the present method are shown. The plasma to be examined can be derived from a lightning column 10, rocket exhaust 12 or weapons discharge 14. A trace amount of hydrogen is added to the plasma and it is analyzed by optical apparatus which includes a mirror following device 16 and spectrographic equipment 18. Two Balmer series lines which are the spectral series lines for hydrogen, are then compared by temperature computer 24 and the ratio of the intensities is representative of the temperature of the plasma. The specific apparatus illustrated is unimportant since the inventive concept of the present invention lies in the method of determining the temperature of the plasma.

Obviously, many modifications and variations of the apparatus are possible in light of the above teachings. It is therefore to be understood that, within the scope of the appended claims, the invention may be practiced otherwise than as specifically described.

What is claimed is:
1. A method of determining the temperature of gaseous plasmas comprising the steps of:
adding a trace gas to said plasma, said trace gas having a low atomic number;
measuring the intensity of a first and a second spectral series line emitted by said gas; and
determining the ratio of the intensity of said first spectral series line to the intensity of said second spectral series line, wherein the ratio of the intensities is representative of the temperature of the plasma.

2. The method of claim 1 wherein said trace gas is hydrogen.

3. The method of claim 2 wherein said spectral series lines are Balmer series lines with alpha and beta lines having wavelengths of 6562.8A and 4861.3A respectively.

4. Method of claim 1 wherein the said trace gas is helium.

* * * * *